United States Patent Office

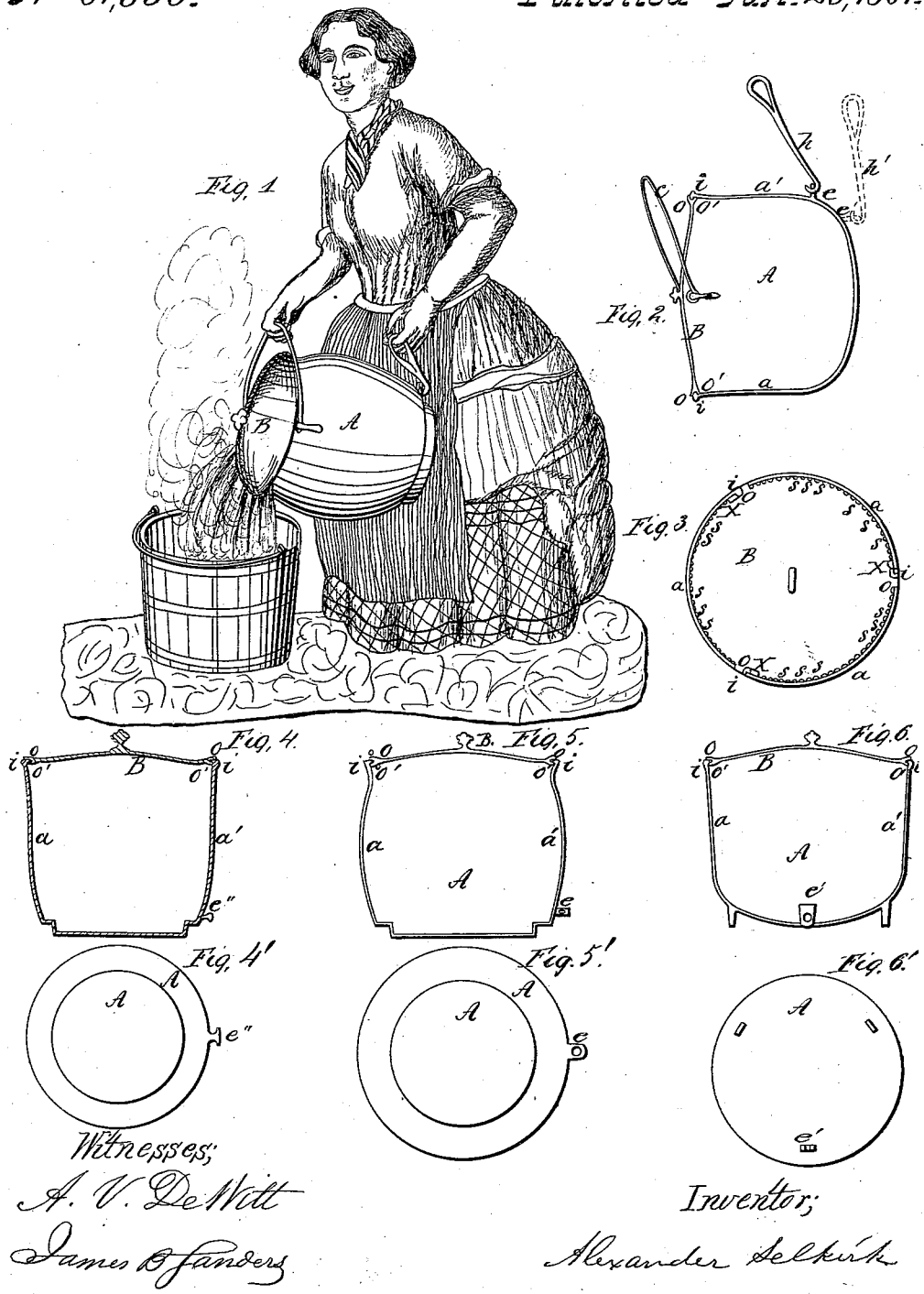

ALEXANDER SELKIRK, OF ALBANY, NEW YORK, ASSIGNOR TO JOHN GIBSON, JR., AND E. J. SELKIRK, OF SAME PLACE.

Letters Patent No. 61,636, dated January 29, 1867.

---

IMPROVEMENT IN COVERS AND IN LIFTING DEVICES FOR KETTLES.

---

The Schedule referred to in these Letters Patent and making part of the same.

---

TO ALL WHOM IT MAY CONCERN:

Be it known that I, ALEXANDER SELKIRK, of the city and county of Albany, in the State of New York, have invented an Improvement in Pots and Kettle, whereby they can be emptied of their contents with greater ease and facility than those constructed as now used; and I do hereby declare that the following is a full and exact description thereof, reference being had to the accompanying drawings, and the letters of reference marked thereon.

Pots and kettles as are now used in the kitchen, wash-boilers, confectioners' and dyers' kettles, are now generally emptied of their contents by grasping the bail or handle of the pot or kettle with one or both hands, (if the contents be hot,) and with the action pressing one side of the bail down in such a way as to lift the vessel up, and at the same time decant it so that the liquid will flow or run out, which action requires great strength and effort as well as care, especially when the vessel contains boiling liquids, which too many cooks and others know by sad accidents from scalding. By my invention less strength and attention are required in pouring out the contents of the pot or kettle, which is done by lifting the vessel by its bail, with one hand, free from the stove or furnace, and with the other hand, by means of a hook catching into a lug or ear already provided at the side or on the bottom of the vessel, the pot or kettle is decanted, the vessel all the while swinging on its bail, thus doing away with increased weight caused by the leverage of the old way, and dividing the actual weight between both hands. When the pot or kettle containing both liquids and solids, such as vegetables and water, meat and water, cloth or yarn and the dyeing liquid, and the liquid only is to be poured out and the solids retained, I use a second part of my invention, whereby the solids are not permitted to leave the vessel, while the liquid is free to flow from it. This I do by a cover, peculiarly constructed with two or more upper lips, which prevent it from sinking down, and two or more under lips, which are held by a corresponding number of lips or projections provided on the inner side and at the edge of the vessel, thus securing the cover; and around the edge of the cover, in whole or in part, at the side opposite the lug or ear, make nitches or half-round notches, so that the edge presents a serrated appearance, and through these half-round holes or openings, (which they are;) when the cover is fixed to its place, the liquid is free to flow.

To enable others to make and use my invention, I will proceed to describe it by the accompanying drawings, reference being had to the letters of reference marked thereon, the same letters referring to like parts.

Figure 1 is a perspective view of pot or kettle in the act of emptying.

Figure 2 is a cross-section when decanted.

Figure 3 is a top view of cover and edge of pot.

Figure 4 is a cross-section showing T-lug on side.

Figure 4' is a view from bottom of same.

Figure 5 is a cross-section showing a pierced ear or lug.

Figure 5' is a view from bottom of same.

Figure 6 is a cross-section showing a pierced leg.

Figure 6' is a view from bottom of same.

A, figs. 1, 2, 4, 5, 6, is a pot or kettle of shape and construction as in common use. $a\ a'$, figs. 2, 4, 5, 6, are the walls of the vessel, and on the side $a'$ is made a projecting ear or lug, $e\ e$, figs. 2 and 5, through which a hole is drilled; or on the side $a'$, figs. 4 4', is made a T-lug, $e''$; or, again, on the bottom, one of the usual legs, $e'$, figs. 6 6', is made wider and drilled. These lugs and leg, $e\ e'\ e''$, are and act as half hinges or joints, which find their concurring half hinges or joints in the handled hook $h\ h'$, figs. 1 and 2, when it is inserted in either $e\ e'$, or around $e''$; and when the vessel is to be emptied it is lifted by the bail $c$ with one hand, and with the other hand the vessel is tilted or decanted by pulling up or lifting with the handled hook $h\ h'$, the pot or kettle swinging on its bail. When solids are to be retained, and the liquids are to be poured off, the cover B, figs. 1, 2, 3, 4, 5, 6, is put on. This cover is constructed of cast or sheet metal, and provided with openings or spaces, $x\ x\ x$, fig. 3, at proper points on the edge of the cover, which, when put on the vessel, permit the lips $i\ i$, figs. 2, 4, 5, 6, on the inner side of the vessel, to pass through, when the cover is slightly turned so as to bring two or more corresponding lips $o'$ $o'$ $o'$, which are attached to the under side of the cover, under the lips $i$ $i$, figs. 2, 4, 5, 6, which hold it to its place, while the two or more lips $o$ $o$ $o$, figs. 2, 3, 4, 5, 6, prevent the cover from falling down into the vessel. Around the edge of the cover, in whole or in part, are made a series of notches, $s$ $s$ $s$, fig. 3, which, when the cover is in its place, are so many openings through which the liquids are free to flow and run out. The cover can be made in open work if desired.

What I claim as my invention, and desire to secure by Letters Patent, is—

1. The pierced lug $e$, leg $e'$, and T-lug $e''$, and the hook $h$, or their equivalents, in combination with the bail $c$, for the purpose set forth substantially as described.

2. The cover B constructed with a notched edge, in whole or in part, or made in open work, in combination with the lips $o$ $o'$ $i$, or their equivalents, for the purpose set forth and described.

ALEXANDER SELKIRK.

Witnesses:
A. V. DE WETT,
JAMES B. SANDERS.